(12) United States Patent
Hsu et al.

(10) Patent No.: US 6,809,886 B2
(45) Date of Patent: Oct. 26, 2004

(54) METHOD FOR MANUFACTURING A COMBINED SOLID IMMERSION LENS (SIL) AND SUBMICRON APERTURE, AND DEVICE THEREOF

(75) Inventors: Wensyang Hsu, Hsin Chu (TW); Hsueh Liang Chou, Hsin Chu (TW); Chung Hao Tien, Hsintien (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 10/603,291

(22) Filed: Jun. 25, 2003

(65) Prior Publication Data

US 2004/0136091 A1 Jul. 15, 2004

(30) Foreign Application Priority Data

Jan. 9, 2003 (TW) ...................................... 92100404 A

(51) Int. Cl.[7] .......................... G02B 3/02; G02B 3/00; H01J 3/14; G11B 11/00; G11B 7/00; G03C 5/00
(52) U.S. Cl. ................... 359/719; 359/718; 359/642; 250/216; 369/13.33; 369/112.23; 369/112.24; 430/321
(58) Field of Search ................... 359/719, 664, 359/712, 717, 718, 819, 811, 642; 250/216, 239, 201.5, 201.3; 369/13.33, 112.23, 112.24, 53.25; 430/320, 321

(56) References Cited

U.S. PATENT DOCUMENTS

| | | | |
|---|---|---|---|
| 6,055,220 A | | 4/2000 | Mamin et al. ........... 369/13.13 |
| 6,154,326 A | | 11/2000 | Ueyanagi et al. ........... 359/819 |
| 6,194,129 B1 | * | 2/2001 | Kasono et al. ............... 430/320 |
| 6,335,522 B1 | * | 1/2002 | Shimada et al. ......... 250/201.3 |
| 6,633,439 B1 | * | 10/2003 | Xu et al. .................... 359/719 |
| 6,714,499 B2 | * | 3/2004 | Katayama ................ 369/53.25 |

OTHER PUBLICATIONS

Mansfield and Kino, "Solid immersion microscope" Appl. Phys. Lett. 57 (1990) pp. 2615, 2616.
Terris, Mamin, and Rugar "Near–field optical data storage using solid immersion lens" Appl. Phys. Lett. 65 (1994) pp. 388–390.
Lane, "Fabrication of Sub–micron Optical Apertures by an Over–Electroplating Method" ISOM (2001) pp. 252–253.

* cited by examiner

*Primary Examiner*—Georgia Epps
*Assistant Examiner*—Jack Dinh
(74) *Attorney, Agent, or Firm*—Bucknam and Archer

(57) ABSTRACT

The invention relates to an integrated method for manufacturing a combined solid immersion lens (SIL) and submicron aperture, and device thereof, comprising depositing a sacrificial layer on a substrate, coating a photoresist on the sacrificial layer and using photo-lithography to form an aperture on the photoresist, applying reflow and etching process to remove the sacrificial layer below the aperture, depositing a conductive material on the photoresist and performing electroplating to reduce the aperture size, then coating another photoresist and using photo-lithography to form a cylindrical phtoresist above the aperture, applying a high temperature thermal reflow to form a microlens, and finally removing the substrate to obtain an optical read/write apparatus with a combined solid immersion lens (SIL) and submicron aperture.

8 Claims, 4 Drawing Sheets

METHOD FOR MANUFACTURING A COMBINED SOLID IMMERSION LENS (SIL) AND SUBMICRON APERTURE, AND DEVICE THEREOF

BACKGROUND

1. Field of the Invention

The invention relates a method for manufacturing a combined solid immersion lens (SIL) and submicron aperture, and device thereof and, more specially, to a batch process for manufacturing a combined solid immersion lens (SIL) and nanometer aperture, which utilizes two photo mask steps incoporated with electroplating to combine a microlens structure with a nanometer order of aperture in order to manufacture an optical read/write apparatus having solid immersion lens and nanometer aperture with high resolution so as to increase optical storage density, and device thereof.

2. Related Arts of the Invention

The high density of optical data storage technologies has been currently a rapidly development and increasingly mature technology. Nowadays, there are already some commercial products like CD-ROM, MO, DVD and so forth utilized in multimedia or data storage. At present, the highest density of data storage in these commercial products performs just nearly 2 to 4.7 $Gb/in^2$ in DVD technology. It means that there are still lots efforts to make the data storage density more advanced.

To get a higher storage density, the optical read/write apparatus (optical pick up head) must offer a small spot to reduce the size of data pits. In conventional optical pick up head, an objective lens is used to focus the light source such that the light source becomes a small spot to write or read data on the media. Among others, it is known that the numerical aperture (NA) and wavelength can dominate the spot size. Besides, it is also approved that a tiny aperture can restrict the spot size. For those reasons, the research here will put emphasis on the fabrications of lens and aperture to gain a smaller spot size.

In contrast with the conventional optical lens, the Solid Immersion Lens (SIL) using solid state technology gets the great performance in reducing spot size. The SIL was introduced by Mansfield and Kino in 1990 for use in high resolution microscopy (Appl. Phys. Lett.57(1990) 2615), and in 1994, Terris introduced the SIL for optical recording (Appl. Phys. Lett.65(1994) 388). As shown in FIG. 1, the FIG. 1 is a schematic drawing showing a conventionally optical read/write apparatus having combined SIL and aperture. The configuration of FIG. 1 can record the data in high density. The reference numerals of FIG. 1, 1 represents SIL, 2 indicates aperture, 3 is beam splitter, 4 is objective, 5 is laser beam, and 6 represents recording media. Typically, the diameter of the focused spot can be $\lambda/NA$ (where NA is the numerical aperture of the lens, i.e. $NA = n \times \sin\theta$, $\lambda$ is the wavelength, n is the refractive index of where the spot is located, and $\theta$ is the incident angle.), the greatest efficacy of the SIL is to increase the NA. Therefore, by using a lens material with high n and a possibly round shaped lens curvature, as well as an arrangement of near field to increase $\theta$ for the increase of the NA, is indeed capable of reducing the spot size. It was known that the photoresist AZ-P4620 ($n \approx 1.65$) meets this requirement. Moreover, the aperture below the SIL can further limit the spot size. However, in traditional etching methods to form the aperture, once overetching occurs, the aperture size becomes larger than the expected. The etching process is hard to be recoverable. Therefore, in 2001, Lane has developed the overelectroplating methods (ISOM, 2001, pp.252–253) to make a tiny aperture in order to improve the disadvantages of the etching methods.

As described above, it is necessary to integrate the SIL with the aperture together to form an excellent optical read/write head so as to achieve a high density optical storage technology. Kate, et al, in 2001, reported a small-sized near-field optical head structure with high throughput. The device combined the SIL and aperture. However, the parts were fabricated separately. After that, the individual part should have to be precisely aligned and bonded. In addition, the planar microlens was far apart from the aperture. The refraction index of air between the microlens and aperture would influence the NA and quality of focused spot.

U.S. Pat. No. 6,335,522B1, entitled "Optical Probe Having a Refractive Index Micro-Lens and Method of Manufacturing The Same", Asimada, et al, published on Jan. 1, 2002 disclosed an optical probe having a movable end arranged on an elastic body and a micro-lens with refractive index adaptive for focussing light in an aperture. The method of which is to fabricate aperture and SIL on two substrates individually, and then combine these two substrate together to accomplish the assembly of the element. The disadvantages include that the alignment exists error and the configuration is hard to be obtained in consecutive steps.

U.S. Pat. No. 6,154,326, entitled "Optical Head, Disk Apparatus, Method For Manufacturing Optical Head, and Optical Element", Ueyanagi; et al, published on Nov. 11, 2000, and U.S. Pat. No. 6,055,220, entitled "Optical Disk Data Storage System With Improved Solid Immersion Lens", Mamin, et al, published on Nov. 11, 2000, disclosed optical apparatus having aperture. The disclosed methods need to use a high resolution apparatus, such as Electron beam or FIB (Focus Ion Beam), to define the aperture size. Therefore, it needs expensive instrument to accomplish this manufacturing process. In addition, there have no further technology disclosed for the shrinkage of the finished aperture.

As shown in FIG. 2 and FIGS. 3A to 3D which illustrate the conventional process for manufacturing SIL and metallic aperture. In these drawings, FIG. 2 is a schematic drawing showing a combined SIL and aperture which are fabricated separately and then combined together, and FIGS. 3A to 3D are cross section views showing manufacturing process steps of the device of the FIG. 2. As shown in these figures, the reference numeral 17 represents silicon substrate, 18 indicates film such as SiN, 19 is Al layer which is deposited on the film. In these conventional process, a combined SIL and aperture is manufactured by using FIB technique to cut away the material to make a small square shaped aperture, and then attaching a SIL on the rear side of the film. As described above, besides the process utilizes the expensive instrument to define the aperture, it does not provide any technology for the shrinkage of the aperture. Moreover, the SIL and aperture are manufactured separately, and after that, they are combined together. Thus, the process is inconvenient and costly.

Therefore, a manufacturing process is developed here to combine SIL and aperture, which is much simpler than the current process for the fabrication of the aperture without any special instrument, and capable of making a complete element by using current available semiconductor manufacturing process in continuous process steps without assembling.

SUMMARY OF THE INVENTION

In view of the above described conventional problems, the object of the invention is to provide an integrated method for manufacturing a combined solid immersion lens (SIL) and submicron aperture, and device thereof, which incorporates photoresist reflow and electroplating to combine a microlens structure with a nanometer order of aperture in order to manufacture an optical read/write apparatus having solid immersion lens and nanometer aperture with high resolution so as to increase optical storage density, and device thereof. The method just uses two photomasks and can be processed in batch, such that the yield and accuracy can be promoted.

To achieve the above object, according to one aspect of the invention, an integrated method for manufacturing a combined solid immersion lens (SIL) and submicron aperture is provided, comprising the following steps: (i) providing a substrate; (ii) depositing a sacrificial layer on the substrate; (iii) coating a first photoresist layer on the sacrificial layer, and using photo—lithography to pattern the first photoresist layer to define an initial aperture; (iv) performing reflow process on the first photoresist layer to make edge of the aperture round and smooth and form a cone-shaped aperture; (v) performing over-etching process to remove the sacrificial layer below the aperture; (vi) depositing a conductive material on the reflowed first photoresist layer as a current conducting layer; (vii) performing electroplating to reduce the aperture size; (viii) coating a second photoresist layer on the electroplating layer, and using photo-lithography to pattern the second photoresist layer to define a cylindrical phtoresist structure, (ix) applying a high temperature thermal reflow to allow the cylindrical photoresist to form a hemi-sphere shaped lens; and (x) removing the substrate.

Further, in accordance with the method of above aspect, the method further comprises steps of using a spin-coating process to coat a third photoresist layer on the substrate after forming the hemi-sphere shaped lens, and using photolithography to make an optical fiber support on the substrate.

Further, in accordance with the method of above aspect, the first photoresist layer and the second photoresist layer may use the same material, and the third photoresist layer should not use the same material as the second photoresist layer.

Furthermore, according to another aspect of the invention, a device for a combined solid immersion lens (SIL) and submicron aperture is provided, which is arranged between an optical read/write head and a recording media, comprising a solid immersion lens (SIL) and a submicron aperture, wherein the aperture is made of a first photoresist layer by using photo-lithography and the first photoresist layer is coated on a sacrificial layer which is deposited on a silicon substrate, and the SIL is made of a second photoresist layer above the aperture by using photolithography.

Further, in accordance with the device of above aspect, the aperture is made by using reflow process on the first photoresist layer to allow edge of the aperture round and smooth and form a cone-shaped aperture so as to increase an amount of light incident into the aperture.

Further, in accordance with the device of above aspect, the SIL is made by using photo-lithography on the second photoresist layer to form a cylindrical shaped photoresist structure and then using high temperature reflow process on the cylindrical shaped photoresist structure to form a hemi-sphere shaped lens.

Further, in accordance with the device of above aspect, the device further comprises an optical fiber support, made by using a spin-coating process to coat a third photoresist layer, and using photo-lithography on the third photoresist layer.

Further, in accordance with the device of above aspect, the first photoresist layer and the second photoresist layer may use the same material, and the third photoresist layer should not use the same material as the second photoresist As described, according to the invention, it is capable of using a consecutive manufacturing process to achieve a complete structure without any assembling procedure. That is to say, the invention utilizes the steps of using the photo-lithography to define an initial aperture on the photoresist layer, applying the reflow process to allow the edge of the photoresist layer becoming round to increase the light amount incident into the aperture, then using the electroplating to shrink the initial aperture size to a nanometer order on the photoresist layer, and finally performing the photolithography and reflow process to make an excellent curvature of the microlens on the aperture. Among others, the whole manufacturing process can be accomplished without any special instrument and can also be performed in a batch preocess. Therefore, the fabrication of the aperture of the invention is much simpler than that of the conventional aperture without any dedicated and expensive instrument or any complicated process. Also, the manufacturing method according to the invention can be performed in batch process to prevent errors from the assembling procedure, so the yield and the accuracy can be promoted accordingly.

BRIEF DESCRIPTION OF DRAWINGS

The invention will present in detail the following description of the preferred embodiments with reference to the following drawings, in that the same reference number represents the identical element, wherein.

DESCRIPTION OF THE PREFERRED EMBODIMENTS

Figure 1:
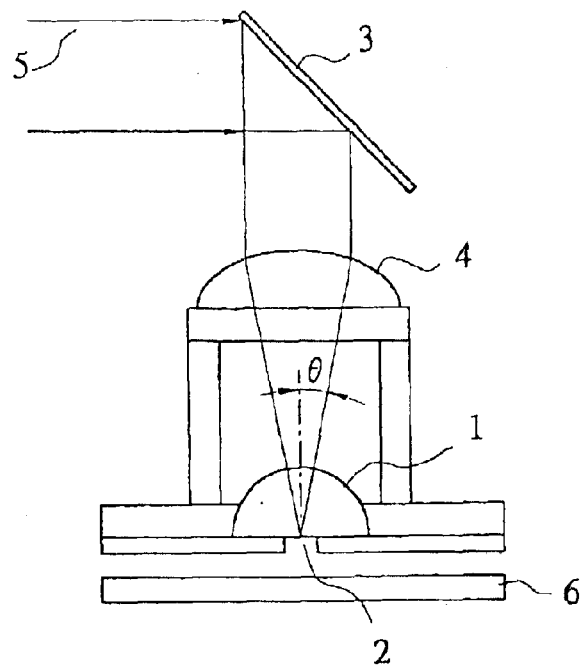
FIG. 1 is a schematic drawing showing a conventionally optical read/write apparatus having combined SIL and aperture.
Figure 2:
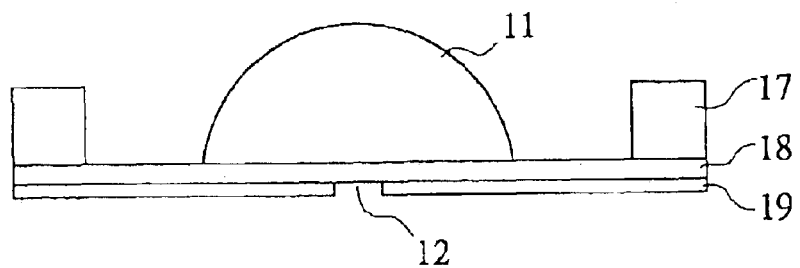
FIG. 2 is a schematic drawing showing a combined SIL and aperture which are fabricated separately and then combined together.
Figure 3A:
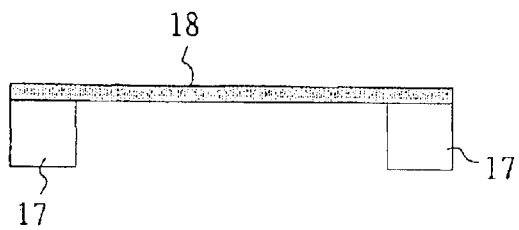
FIGS. 3A to 3D are cross section views showing manufacturing process steps of the device of the FIG. 2.
Figure 3B:
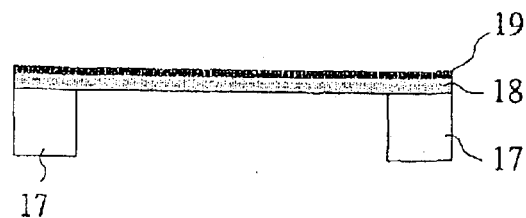
Figure 3C:
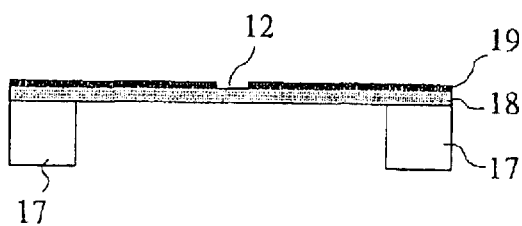
Figure 3D:
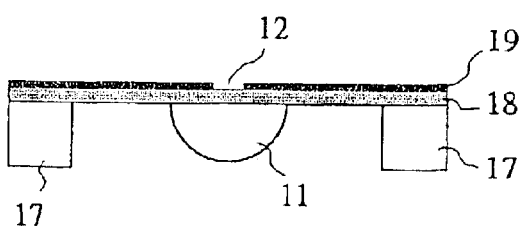
Figure 4:
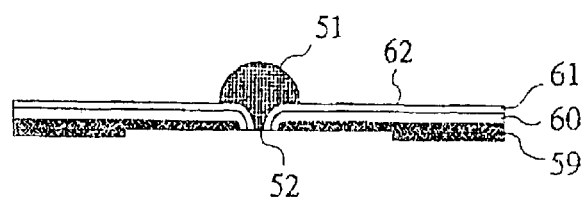
FIG. 4 is a schematic view showing a preferred embodiment of an optical read/write device having combined SIL and aperture capable of performing high density data recording in accordance with the invention.

Referring to FIGS. 4 and 5, FIG. 4 is a schematic view showing a preferred embodiment of an optical read/write device having combined SIL and aperture capable of performing high density data recording in accordance with the invention, and FIGS. 5A to 5I are cross section views showing manufacturing process steps of the device of the FIG. 4. In FIG. 4, a device for a combined solid immersion lens (SIL) and submicron aperture is provided, which is arranged between an optical read/write head and a recording media (not shown) and comprises a solid immersion lens (SIL) 51 and an aperture 52. The aperture 52 is made of a first photoresist layer 59 by using photo-lithography. The first photoresist layer is coated on a sacrificial layer which is deposited on a silicon substrate. The SIL 51 is made of a second photoresist layer (not shown) above the aperture by using the photolithography. In these drawings, reference numerals 60, 61 represent conductive material and electroplating layer, respectively, and 62 represents a silicon dioxide layer for use of fabricating an optical fiber support. Further, the manufacturing process for the device of the FIG. 4 will be described in detail in FIG. 5.

As shown in FIG. 5, a method for manufacturing a combined solid immersion lens (SIL) and submicron aperture is illustrated. Firstly, in FIG. 5A, a 6 micrometers thick of a sacrificial layer 58, such as a silicon dioxide is grown on a substrate 57 by PECVD (Plasma Enhanced CVD). In FIG. 5B, a first photoresist layer 59, such as AZ-P4620, is coated on the sacrificial layer 58. By using the photolithography, the first photoresist layer 59 is patterned to define an aperture 52. Then, the first photoresist layer 59 is performed on the reflow process, for example the substrate 57 is placed on a hot plate for 4 hours, at 150° C. to perform the reflow of the first photoresistlayer 59, so that the edge of the aperture becomes round and smooth and presents a conical shape to increase the amount of the incident light, without any additional etching steps, as shown in FIG. 5C. After the reflow, the processed substrate 57 is placed in the solution of etchant, such as BOE for about 10 minutes to etch away the sacrificial layer 58 under the aperture, as shown in FIG. 5D. The purpose of this step is to obtain a appropriate gap between the substrate 57 and the reflowed first photoresist layer. Next, a conducting material, such as Cu is sputtered on the reflowed first photoresist layer as a seed layer at a thickness of about 500 Å for electrical current conduction in eletroplating step. The result is shown in FIG. 5E.

Figure 5A:
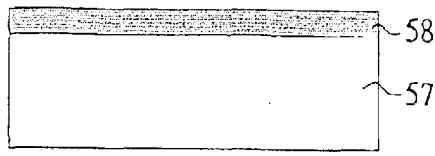
FIGS. 5A to 5I are cross section views showing manufacturing process steps of the device of the FIG. 4.
Figure 5E:
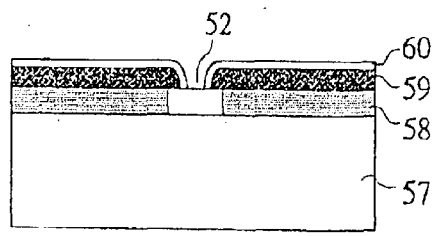
Figure 5B:
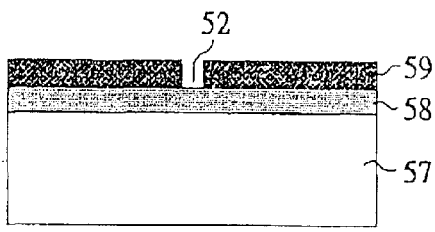
Figure 5F:
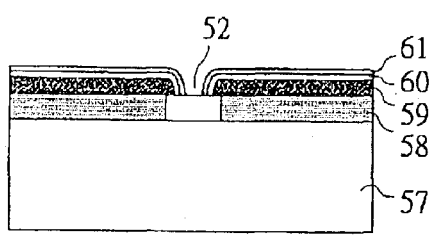
Figure 5C:
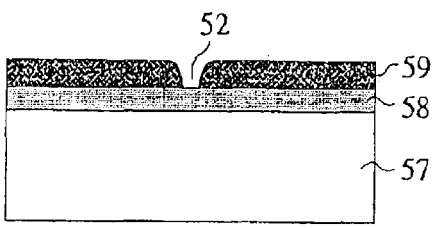
Figure 5G:
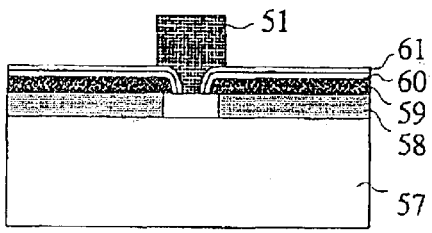
Figure 5D:
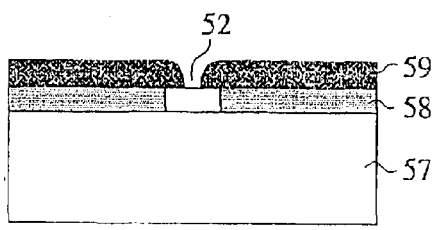
Figure 5H:
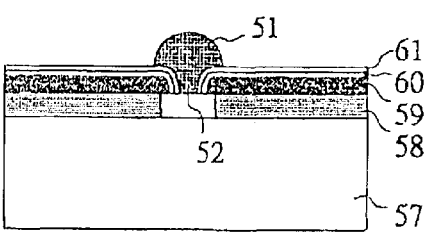
Figure 5I:
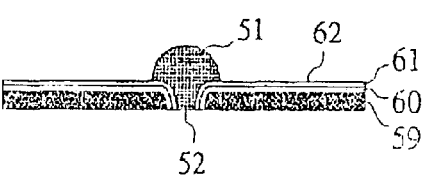

Then, the process goes to the eletroplating step to plate a layer of a metallic layer 61 in order to shrink the size of the defined aperture 52 into the order of nanometers, as shown in FIG. 5F. Then, a second photoresist layer 51 such as AZ-P4620, is coated on the aperture to form a cylindrical photoresist structure with around 30 micrometer thick, as shown in FIG. 5G. Then the process proceeds to the reflow process for the second photoresist layer 51, for example the substrate 57 is placed on a hot plate for 4 hours, at 150° C. to perform the reflow of the second photoresistlayer 51 to allow the cylindrical photoresist structure to form a hemi-sphere shaped microlens, as shown in FIG. 5H. Finally, the sacrificial layer 58 is removed by the etchant so as to separate the substrate 57 and obtain a device of combined SIL and the submicron aperture, as shown in FIG. 5I.

Figure 6A:
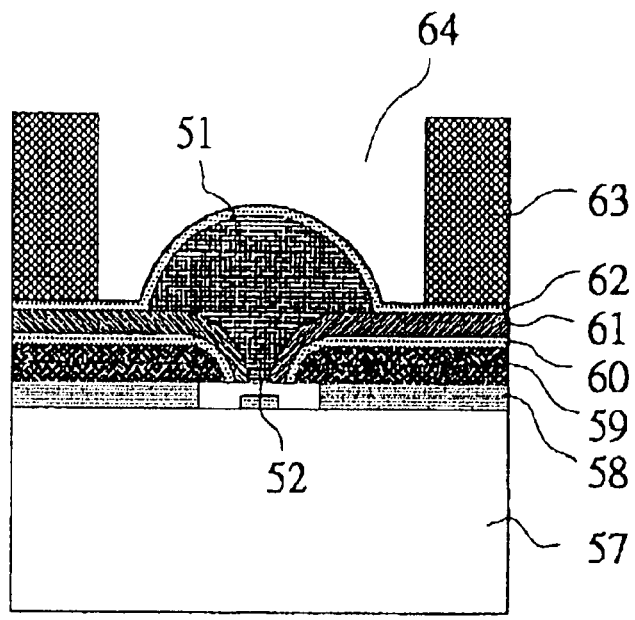
FIGS. 6A and 6B are cross section views showing an alternative embodiment in accordance with the invention.
Figure 6B:
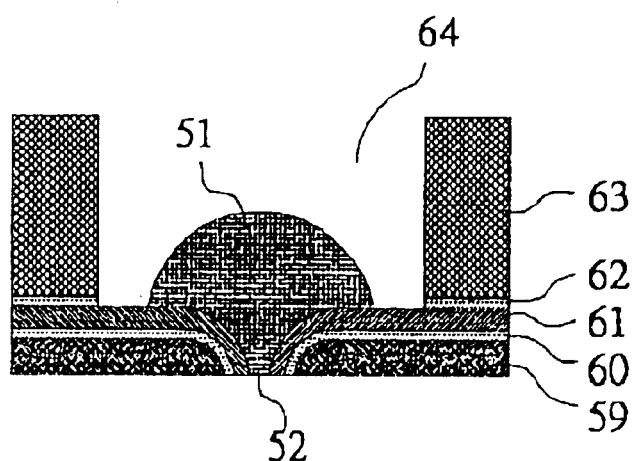

Alternatively, after combination of the SIL and aperture, in order to enhance the device and provide a support for an optical fiber, the following will illustrate a manufacturing process for the optical fiber support with reference to FIG. 6. In this process, there needs an additional photomask. As shown in FIGS. 6A and 6B, after completion of the device of the FIG. 5H and before the step of removal of the substrate 57, a thin silicon dioxide having thickness of around 1500 Å is sputtered on the microlens to prevent the microlens which is formed of the photoresist of AZ-P4620 from damage caused by the developer that is typically used for forming the support.

Next, a third photoresist layer 63 is formed by using spin-coating to apply a photoresist such as SU-8 on the device. Then, the photoresist layer 63 is patterned by the photo-lithography to make an optical fiber support 64 on the device. After that, the substrate is separated in order to obtain the final structure, i.e., the combined SIL and aperture together with the support, as shown in FIGS. 6A and 6B. Preferably, the first photoresist layer and the second photoresist layer may use the same or different material, and the third photoresist layer should not use the same material as the second photoresist layer.

As described above, the structure of a near field combined optical read/write device has been made as including a nanometer aperture 52, a hemi-sphere shaped lens, and an optical fiber support without any bonding and/or assembling pocess. For example, the conical shaped aperture is made by the reflow and eletroplating instead of the conventionally complicated etch process. Also, the microlens can also be made by the reflow process. Although the reflow time and the patterned size of the second photoresist layer will all influence the refractive index of the lens, however, this portion of the study is not incuded in the scope of the invention.

Having described the preferred embodiments of the invention on above, however, they are not intended to be the limit of the invention. It should be noted that modifications and variations of the invention can be made by a person who is skillful in the art in light of the above teachings. It is therefore to be understood that various changes, equivalents and modifications may be made in the particular examples of the invention without departing from the scope and the spirit of the invention as outlined by the appended claims.

What is claimed is:

1. A method for manufacturing a combined solid immersion lens (SIL) and submicron aperture, comprising the following steps:

(i) providing a substrate;

(ii) depositing a sacrificial layer on the substrate;

(iii) coating a first photoresist layer on the sacrificial layer, and using photo-lithography to pattern said first photoresist layer to define an initial aperture;

(iv) performing reflow process on said first photoresist layer to make edge of the aperture round and smooth and form a cone-shaped aperture;

(v) performing over-etching process to remove the sacrificial layer below the aperture;

(vi) depositing a conductive material on the reflowed first photoresist layer as a current conducting layer;

(vii) performing electroplating to reduce the aperture size;

(viii) coating a second photoresist layer on the electroplating layer, and using photo-lithography to pattern said second photoresist to define a cylindrical photoresist structure, (ix) applying a high temperature thermal reflow to allow the cylindrical photoresist structure to form a hemi-sphere shaped lens; and (x) removing the subtrate.

2. The method according to claim 1, further comprising steps of using a spin-coating process to coat a third photoresist layer on the substrate after forming the hemi-sphere shaped lens, and using photolithography to make an optical fiber support on the substrate.

3. The method according to claim 1 wherein said first photoresist layer and second photoresist layer may use the same or different material, and said third photoresist layer should not use the same material as said second photoresist layer.

4. A device for a combined solid immersion lens (SIL) and submicron aperture, arranged between an optical read/write head and a recording media, comprising a solid immersion lens (SIL) and a submicron aperture, wherein said aperture is made of a first photoresist layer by using photo-lithography and said first photoresist layer is coated on a sacrificial layer which is deposited on a silicon substrate, and said SIL is made of a second photoresist layer above said aperture by using photolithography.

5. The device according to claim 4, wherein said aperture is made by using reflow process on said first photoresist layer to allow edge of said aperture round and smooth and form a cone-shaped aperture to increase an amount of light incident into said aperture.

6. The device according to claim 4, wherein said SIL is made by using photo-lithography on said second photoresist layer to form a cylindrical shaped photoresist structure and then using high temperature reflow process on the cylindrical shaped photoresist structure to form a hemi-sphere shaped lens.

7. The device according to claim 4, further comprising an optical fiber support, made by using a spin-coating process to coat a third photoresist layer on the substrate, and using photo-lithography on said third photoresist layer.

8. The device according to claim 7 wherein said first photoresist layer and the second photoresist layer may use the same or different material, and said third photoresist layer should not use the same material as said second photoresist layer.

* * * * *